(12) United States Patent
Geiger et al.

(10) Patent No.: US 6,632,054 B2
(45) Date of Patent: Oct. 14, 2003

(54) PORTAL MILLING MACHINE

(75) Inventors: Michael Geiger, Starnberg (DE); Peter Meier, Goldau (CH)

(73) Assignee: Mikron Comp-Tec AG, Nidau (CH)

( * ) Notice: Subject to any disclaimer, the term of this patent is extended or adjusted under 35 U.S.C. 154(b) by 0 days.

(21) Appl. No.: 09/947,450

(22) Filed: Sep. 7, 2001

(65) Prior Publication Data

US 2002/0031411 A1 Mar. 14, 2002

(30) Foreign Application Priority Data

Sep. 8, 2000 (EP) .............................................. 00810809

(51) Int. Cl.[7] .............................. B23C 1/12; B23D 7/00; B23B 17/00
(52) U.S. Cl. ........................ 409/202; 409/212; 409/235; 409/164; 409/165; 409/167; 82/149; 29/33 P
(58) Field of Search ................................ 409/235, 202, 409/212, 164, 165, 167, 219; 291/33 P; 82/149

(56) References Cited

U.S. PATENT DOCUMENTS

| | | | | |
|---|---|---|---|---|
| 4,534,093 A | * | 8/1985 | Jahnke et al. ................ | 29/26 A |
| 4,705,438 A | * | 11/1987 | Zimmerman et al. ....... | 409/137 |
| 4,955,770 A | * | 9/1990 | Kitamura ..................... | 409/137 |
| 5,294,220 A | | 3/1994 | Ohmstede et al. | |
| 5,375,952 A | * | 12/1994 | Line ........................... | 409/202 |

(List continued on next page.)

FOREIGN PATENT DOCUMENTS

DE 2528677 1/1976
DE 2521036 11/1976

(List continued on next page.)

OTHER PUBLICATIONS

Push, et al., "Choosing the Arrangements of Double–Head Lathes", Russian Engineering ReSearch, Allerton Press, New York, US, Bd. 14, Nr. 3, 1994, pp. 50–60.

(List continued on next page.)

*Primary Examiner*—A. L. Wellington
*Assistant Examiner*—Dana Ross
(74) *Attorney, Agent, or Firm*—Birch, Stewart, Kolasch & Birch, LLP

(57) ABSTRACT

A portal milling machine has an elongated machine bed (10), the longitudinal direction of which defines an X-direction (2) (machine longitudinal direction). Furthermore, the portal milling machine is provided with a portal (20) which is arranged at right angles to the X-direction and has an elongated plan form, the longitudinal direction of which defines a Y-direction (4) (portal longitudinal direction). A milling unit (50) is arranged on the portal (20) so as to be movable in a translatory manner in a first direction and a second direction transversely to the X-direction (2), and a linear guide (14, 16) which leads through the portal in the X-direction (2) and is intended for a slide (30) carrying a work mounting device (32) and movable in the X-direction (2) is attached to the machine bed (10). In plan form, a part of the machine bed (10) projects beyond the portal (20) in the X-direction (2) at least on one side. The machine bed (10), with regard to the portal (20), is offset in the Y-direction (4) toward one longitudinal end of the portal (20) in such a way that, in the region of the angle enclosed between the projecting machine bed part and the portal (20), good accessibility to the working region of the machine in the region of the portal center is ensured from the other longitudinal end of the portal (20).

14 Claims, 2 Drawing Sheets

U.S. PATENT DOCUMENTS

| | | | | |
|---|---|---|---|---|
| 5,575,318 A | * | 11/1996 | Susnjara | 409/235 |
| 5,674,169 A | | 10/1997 | Yang | |
| 5,678,291 A | * | 10/1997 | Braun | 409/202 |
| 6,068,431 A | * | 5/2000 | Line | 409/202 |
| 6,161,995 A | * | 12/2000 | Wakazono et al. | 409/235 |
| 6,217,496 B1 | * | 4/2001 | Lindem | 409/212 |

FOREIGN PATENT DOCUMENTS

| | | |
|---|---|---|
| DE | 2521036 A1 | 11/1976 |
| DE | 4015570 A1 | 11/1991 |
| DE | 4242906 A1 | 6/1994 |
| EP | 0405112 | 1/1991 |
| EP | 0405111 A2 | 2/1991 |
| EP | 0528052 | 2/1993 |
| JP | 691457 | 4/1994 |
| JP | 06091457 | 4/1994 |
| JP | 10286734 | 10/1998 |
| JP | 10286734 | 1/1999 |
| SE | 204088 | 5/1966 |

OTHER PUBLICATIONS

Jackisch U–V et a: "Mineralguss–Gerechte Maschinen Konstruktion", Werkstatt Und Betrieb, Carl Hanser Verlag, Munchen, DE, Bd. 133, Nr. 1/2, Feb. 2000, Seiten 51–52, XP–000912386.

* cited by examiner

PORTAL MILLING MACHINE

TECHNICAL FIELD

The invention relates to a portal milling machine, i.e. a milling machine in a portal type of construction, according to the preamble of the independent patent claims.

PRIOR ART

Portal milling machines of the type mentioned at the beginning are generally known. They have a machine bed and a portal firmly connected to the machine bed. On the portal, which normally comprises two vertical columns firmly connected to the machine bed and a crossbeam connecting these columns to one another, a milling unit provided with a milling spindle or a tool spindle is arranged so as to be movable in a translatory manner in a first direction (Z) and a second direction (Y) transversely to the machine longitudinal axis (X) defined by the portal passage. Furthermore, portal milling machines of said type have a plane linear guide firmly connected to the machine bed. The linear guide is arranged essentially horizontally in the machine longitudinal direction (X), i.e. in the X-direction. It leads through the portal and serves to guide a slide which is movable in the X-direction through the portal and carries a work mounting device, typically in the form of a work table. Such portal milling machines are normally designed and arranged in such a way that the translatory direction of movement X runs essentially horizontally through the portal, the translatory direction of movement Z runs essentially vertically, and the translatory direction of movement Y runs essentially horizontally and at right angles to the X-direction.

Compared with single-column milling machines in a C-type of construction, which have a single, essentially vertical column, to which an extension arm carrying the milling unit is attached at the top and which is firmly connected to the machine bed at the bottom, the machine bed carrying a work table, portal milling machines have advantages with regard to the rigidity of the machine. The structure closed upon itself, consisting of the portal and the machine bed, can absorb greater forces, given the same dimensioning, than the structure, open on one side, of a single-column machine in a C-type of construction.

On the other hand, portal milling machines are less suitable for automated operation than single-column machines in a C-type of construction. On the one hand, in portal milling machines, the chip disposal is problematic, since the chips produced during the milling tend to remain sitting on the linear guide leading through the portal or on the chip cover guard of the linear guide. On the other hand, the accessibility to the tool processing point lying in the region of the portal and thus to the tool and to the workpiece is restricted by the portal.

DESCRIPTION OF THE INVENTION

The object of the invention is to specify a milling machine in a portal type of construction which can be readily automated and in particular ensures good accessibility to the tool processing point and permits good chip disposal.

The solution of the object is defined by the features of the independent patent claims. According to the invention, a portal milling machine has an elongated machine bed, the longitudinal direction of which defines an X-direction (also designated as machine longitudinal direction). Furthermore, the portal milling machine is provided with a portal which is arranged at right angles to the X-direction and has an elongated plan form, the longitudinal direction of which defines a Y-direction (also designated as portal longitudinal direction) (running at right angles to the X-direction). A milling unit is arranged on the portal so as to be movable in a translatory manner in a first direction and a second direction transversely to the X-direction, and a linear guide which leads through the portal in the X-direction and is intended for a slide carrying a work mounting device and movable in the X-direction is attached to the machine bed. In plan form, a part of the machine bed projects beyond the portal in the X-direction at least on one side, in which case this projecting part of the machine bed may also be the entire machine bed. According to the invention, the machine bed, with regard to the portal, is offset in the Y-direction toward one longitudinal end of the portal in such a way that, in the region of the angle enclosed between the projecting machine bed part and the portal, good accessibility to the working region of the machine in the region of the portal center is ensured from the other longitudinal end of the portal.

Due to the asymmetrical type of construction with regard to a vertical center plane running in the X-direction through the portal center, good accessibility to the tool processing point in the optimum working region of the machine, namely in the region of the portal center, is provided on the one hand. An operator can come from the side comparatively close up to the slide carrying the work mounting device or to the work processing point. This proves to be advantageous, e.g. when setting the machine for new machining operations, and helps to improve the ergonomics of the portal milling machine according to the invention. On the other hand, space is also created on the portal side remote from the machine bed, and this space may be utilized for the installation of the chip conveying device. On the whole, this provides for the possibility of automated operation of the portal milling machine.

The machine bed, with regard to the portal center, may be offset in the Y-direction toward the one longitudinal end of the portal by more than one sixth, preferably even by more than two sixths, of the clear width of the portal passage, in order to create sufficient space in the region of the other longitudinal end of the portal.

In the portal milling machine according to the invention having an asymmetrical type of construction, the portal is preferably arranged relative to the machine bed such that the structure formed from the portal and the machine bed has essentially a plan form like a two-legged right angle, one leg being formed by the machine bed plan extending in the X-direction and the other leg being formed by the portal plan extending in the Y-direction. In this case, the machine bed is arranged so as to be offset completely toward one longitudinal end of the portal and it projects in the X-direction beyond the portal merely on one portal side. As a result, an especially simple and compact structure of the machine is achieved overall.

According to a preferred embodiment of the invention, the linear guide is a plane linear guide arranged essentially horizontally (i.e. running in the horizontal direction), the guide plane of the linear guide, relative to the horizontal, being inclined by an angle transversely to the X-direction in such a way that chips produced during the milling fall down solely on account of the force of gravity from the linear guide or from a cover protecting the latter from the chips.

Throughout the present description and the claims, the expression "linear guide" (also designated as straight guide)

refers to a bearing for guiding parts moving rectilinearly. A linear guide is designated as plane if it defines a guide plane extending in the guide longitudinal direction. In the case of a linear guide having an essentially flat, plane guide bed, the guide plane is determined by the guide bed surface. In this case, the guide bed surface need not be completely plane, but rather may be provided with passages, recesses, reinforcing ribs or similar structures which deviate in sections from the plane form of the guide bed surface. In a linear guide which comprises essentially a single, flat guideway (e.g. a flat guide or a dovetail guide), the guideway surface may be designated as guide plane of the linear guide. If a linear guide comprises two parallel rails or slideways, the plane determined by the two parallel rails or slideways may be designated as guide plane. If a linear guide is designed as a profiled rail guide having an essentially plane profile surface, to which a plurality of parallel guide rails are attached, this profile surface may be designated as guide plane of the linear guide.

According to the abovementioned preferred embodiment of the invention, the guide plane of the plane linear guide running through the portal is considerably inclined like an inclined bed guide transversely to the guide direction. The considerable inclination of the guide plane achieves the effect that chips which are produced during the milling operation and fall onto the linear guide or onto a cover provided for protecting the linear guide from chips do not remain lying on the linear guide or the chip guard cover but slip off the latter on account of the force of gravity. As a result, good chip disposal is achieved, a factor which is a precondition for automating the portal milling machine.

Furthermore, the considerable inclination of the guide plane enables a work changing device, possibly arranged laterally next to the linear guide, to be arranged closer to the slide carrying the work mounting device, i.e. the X-slide, than would be possible in the case of a plane linear guide having a horizontal guide plane. As a result, the times for the workpiece change can be reduced, which helps to increase the productivity of the portal milling machine according to the invention.

In addition, on account of the considerable inclination or angular setting of the guide plane of the linear guide, the accessibility to the machine center in the region of the portal center is further improved. An operator can come from the side closer to the slide carrying the work mounting device or to the tool processing point than would be possible in the case of a plane linear guide having a horizontal guide plane.

Furthermore, the angular setting of the guide bed or of the guide plane of the linear guide enables the slide carrying the work mounting device to be mounted at various heights in a comparatively simple manner. As a result, the portal milling machine according to the invention can be better adapted for machining workpieces having different dimensions. In addition, the angular setting of the guide plane of the linear guide makes is possible for the slide having the work mounting device to be installed in such a way that, despite the machine bed being offset from the portal center to one portal end, it can be moved centrally through the portal (and thus through a region favorable for the workpiece machining) by the slide being arranged essentially laterally on the linear guide.

The guide plane of the linear guide, relative to the horizontal, is preferably inclined transversely to the X-direction by an angle which is greater than 40 degrees, preferably even greater than 60 degrees. In particular, this angle may also be approximately 90 degrees. For heavy X-slides, a rather small angle of inclination of, for example, approximately 45 degrees is preferred. A comparatively small angle of inclination of the guide plane ensures better seating of the heavy slide on the linear guide. On the other hand, angles of inclination which are rather larger are preferred for light X-slides in order to ensure that the chips slip off the linear guide or its chip guard cover in an optimum manner. In particular, an angle of inclination of 90 degrees may also be used for light slides. In this case, the guide plane or the guide bed of the linear guide is arranged vertically.

However, variants of the invention in which the guide plane of the linear guide, relative to the horizontal, is inclined transversely to the X-direction by an angle which is greater than 90 degrees are also possible. The guide plane and the guide bed are then arranged in an overhanging manner, so that the X-slide is guided in a suspended manner on the linear guide. In this variant of the invention, the linear guide is protected in an especially effective manner from chips falling down.

In a portal milling machine according to the invention, the linear guide is preferably designed in such a way that the X-slide can alternatively be mounted at various heights on the linear guide. This permits simple adaptation of the portal milling machine for machining workpieces having different sizes. For this purpose, depending on the application, tables having different machining heights may be mounted. The possibility of being able to mount the X-slides at various heights when using rotary and/or swivel tables for 5-axis machining proves to be especially advantageous. Such tables are relatively tall and accordingly restrict the passage or the workpiece size in conventional portal machines.

The portal machine according to the invention may have a further slide (Y-slide) which is arranged on the portal so as to be movable in the horizontal Y-direction transversely to the X-direction, the milling unit in the form of a spindle head provided with a milling spindle being arranged on this Y-slide so as to be movable in the vertical Z-direction. This embodiment of the invention is especially suitable for high-speed milling, since only comparatively small masses have to be moved in order to move the spindle head. As an alternative to this, however, a portal milling machine according to the invention may also comprise a portal having a cross member which is movable in the vertical Z-direction and on which a spindle head movable in the Y-direction is arranged.

According to a further advantageous variant of the invention, in a portal milling machine comprising a portal on which a milling unit is arranged so as to be movable in a translatory manner in a first direction (Z) and a second direction (Y) transversely to the machine longitudinal direction (X), and comprising an elongated machine bed to which a plane linear guide which leads essentially horizontally through the portal in the machine longitudinal direction (X) and is intended for a slide carrying a work mounting device and movable in the X-direction, the structure formed from the machine bed and the portal is designed as a monolithic, homokinetic block (also designated as monoblock). The design of the structure comprising the machine bed and the portal as a monoblock ensures good thermal conduction between the various parts of the structure and good rigidity of the structure. Such a portal milling machine with a monoblock structure may of course also be provided with a considerably inclined guide plane of the plane linear guide extending in the X-direction and/or with a machine bed arranged so as to be offset with regard to the portal center toward one longitudinal end of the portal. However, the aspect of designing the structure comprising the machine bed and the portal as a monoblock also proves to be advantageous irrespective of the considerable inclination of the guide plane of the plane linear guide extending in the X-direction or of the machine bed arrangement offset with regard to the portal center.

In a portal milling machine with a monoblock structure, the entire monoblock is preferably produced from polymer concrete. In principle, however, other materials suitable for the construction of portal milling machines, e.g. steel, may also be used.

The monoblock structure may be composed of individual castings. In this case, the individual castings may be produced from a uniform casting material, intermediate spaces possibly present between the castings after the assembly of the individual castings to form the desired structure being filled with the same casting material in order to produce a homogeneous connection between the castings with regard to the material. In this way, complicated monoblock structures can also be produced.

The portal is preferably designed as a one-piece casting into which the machine bed, likewise designed as a one-piece casting, is inserted, the machine bed being designed as a support to which the linear guide is attached. In this way, portal milling machines having X-guides or X-strokes of different length can be produced in a relatively simple and cost-effective manner.

In the case of a comparatively simple form, however, the entire structure formed from the machine bed and the portal may also be designed as a one-piece casting. This makes possible exceptionally simple manufacture of this structure. In addition, especially good rigidity and thermal conductivity of the structure are achieved.

Further advantageous embodiments and feature combinations of the invention follow from the detailed description below and all the patent claims in their entirety.

BRIEF DESCRIPTION OF THE DRAWINGS

In the drawings used for explaining the exemplary embodiment.

Basically, the same parts are provided with the same reference numerals in the figures.

WAYS OF IMPLEMENTING THE INVENTION

Figure 1:
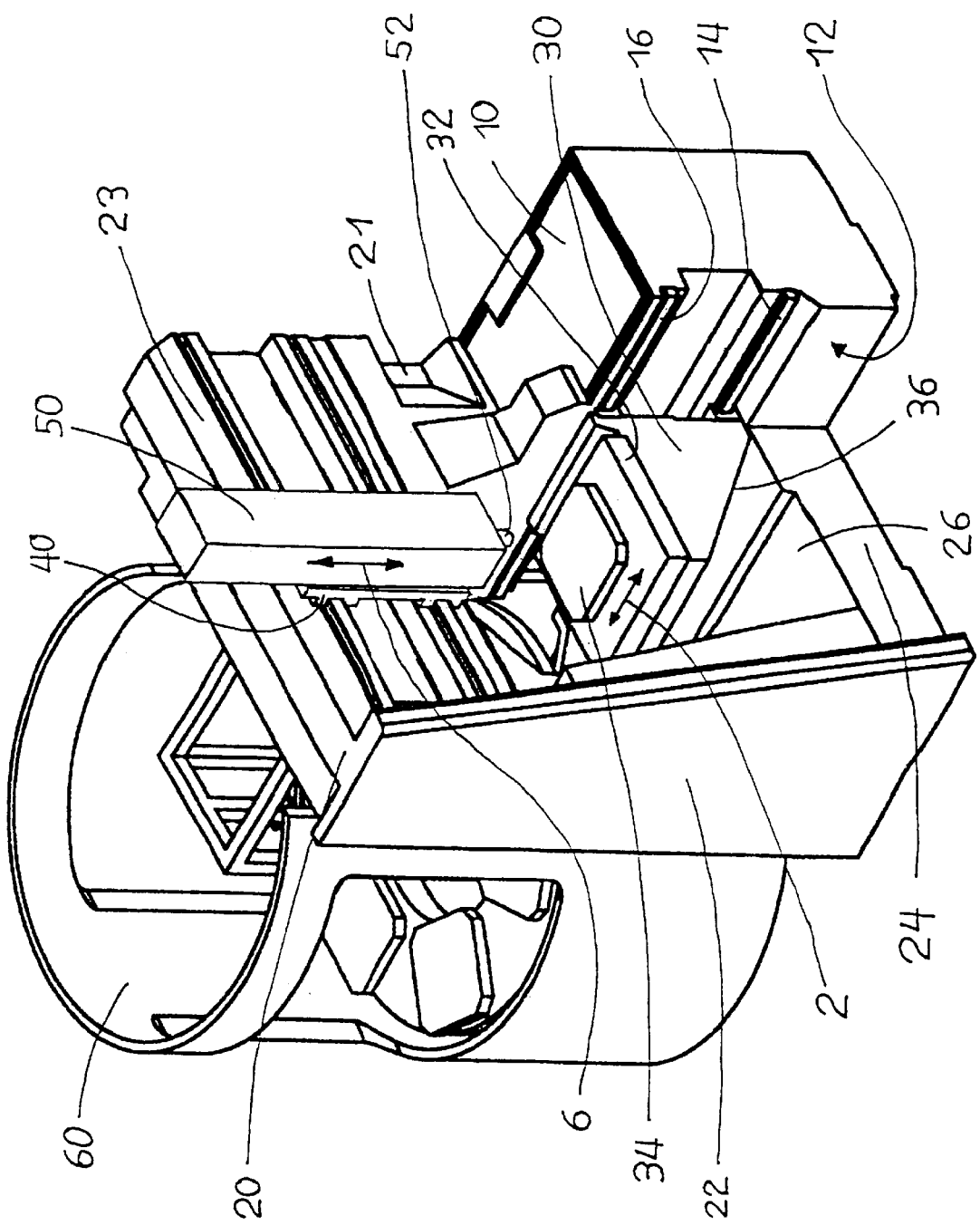
FIG. 1 shows a portal milling machine according to a preferred embodiment in a simplified perspective view.
Figure 2:
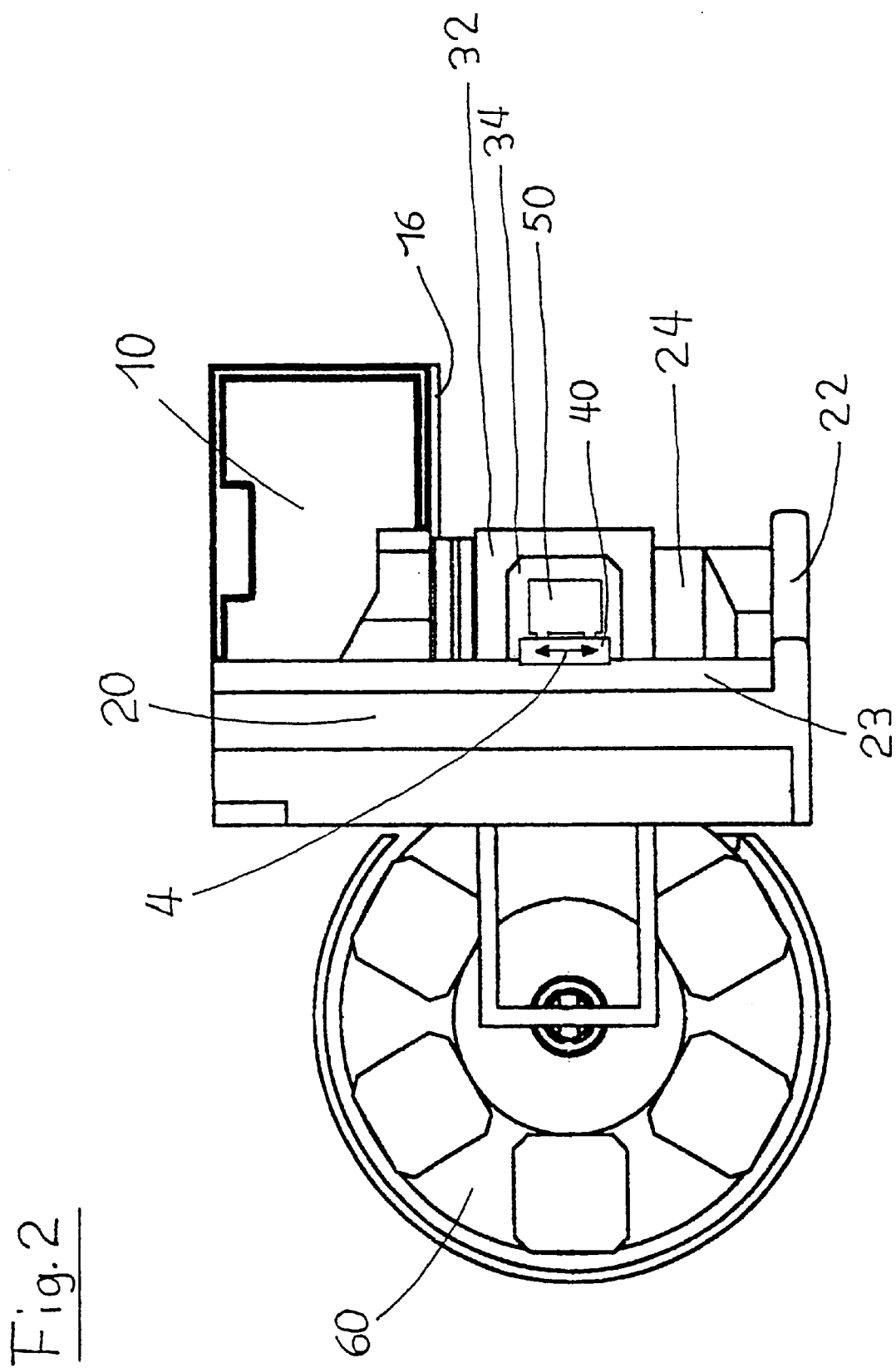
FIG. 2 shows the portal milling machine from FIG. 1 in a plan view.

The portal milling machine shown in FIGS. 1 and 2 comprises a machine bed 10 which essentially has the form of an elongated parallelepiped with a base side, a top side, two longitudinal sides and two end faces. The parallelepiped-shaped machine bed 10 is arranged on a firm foundation (not shown) in such a way that the base and top sides lie horizontally and the longitudinal sides and the end faces are disposed vertically. The longitudinal direction of the machine bed 10 (also designated as machine longitudinal direction) is designated below as the X-direction of the portal milling machine shown in FIG. 1 and FIG. 2.

Arranged in the region of one longitudinal end of the machine bed is a portal 20 which is arranged at right angles to the machine bed 10 in such a way as to be firmly connected to the machine bed 10. The portal 20 comprises a short column 21, which is mounted on the top side of the parallelepiped-shaped machine bed 10 in the region of the portal-side longitudinal end of the machine bed 10.

Furthermore, the portal 20 comprises a long column 22, which is longer than the short column 21 by the parallelepiped height of the machine bed 10. The two columns 21, 22 are arranged essentially parallel to one another, vertically disposed and at a distance from one another. They are firmly connected to one another in the region of their top ends by an elongated cross member 23, which is arranged horizontally and at right angles to the longitudinal direction of the machine bed 10 (i.e. to the X-direction) and is firmly connected to both the long member 22 and the short member 21. The longitudinal direction of the cross member 23 is designated below as the Y-direction of the machine shown in FIG. 1 and FIG. 2.

In the region of the bottom end of the long column 22, an elongated cross traverse 24 (designated below as base traverse 24) is firmly attached at one of its longitudinal ends to this column 22. The other longitudinal end of this base traverse 24, at that longitudinal side 12 of the machine bed 10 facing the long column (designated below as inner longitudinal side 12 of the machine bed 10), is firmly attached in a bottom region of the same. The base traverse 24 is arranged essentially parallel to the cross member 23 of the portal and therefore extends in the Y-direction. It provides a firm connection between the foot of the long column 22 and the parallelepiped-shaped machine bed 10.

The two columns 21, 22, the cross member 23, the machine bed 10 and the base traverse 24, as an entity, form a structure which is closed in a ring shape and which defines an essentially rectangular passage (designated below as portal passage) running in the X-direction. This portal passage is defined at the bottom by the base traverse 24, on one side by the long column 22, on the other side by the machine bed 10 and the short column 21 and at the top by the cross member 23.

The structure formed from the two columns 21, 22, the cross member 23, the machine bed 10 and the base traverse 24 is designed as a monolithic, homokinetic block, i.e. as a monoblock. The entire monoblock is produced from polymer concrete. The monoblock shown in FIGS. 1 to 2 is composed of a plurality of components, which are first of all produced as one-piece castings and are then assembled to form the monoblock shown in FIGS. 1 to 2, the intermediate spaces between the individual components having been filled with polymer concrete in order to firmly connect the components to one another and form a monolithic structure.

As can best be seen in FIG. 2, the structure formed from the portal 20 and the machine bed 10 essentially has a plan form like a two-legged angle. One leg of this angle form is formed by the plan of the machine bed 10, and the other leg is formed by the plan of the portal 20. The portal side lying on the outside of the angle is designated below as the rear side of the portal 20, whereas the portal side lying on the inside of the angle (from which side the machine bed 10 extends to its longitudinal end remote from the portal 20) is designated as the front side of the portal 20.

A linear guide running horizontally in the X-direction (designated below as the X-guide) is arranged on the inner longitudinal side 12 of the machine bed 10 (i.e. on that longitudinal side 12 of the machine bed 10 which defines the portal passage). The X-guide comprises two parallel guide rails 14, 16 which extend in the X-direction, are firmly attached one above the other to the vertical inner longitudinal side 12 of the machine bed 10 and define the guide plane of the X-guide. The X-guide is therefore a plane linear guide having a vertical guide plane.

The guide rails 14, 16 of the X-guide serve to guide a slide 30 (X-slide 30) which is movable in the X-direction, is designed as a work table 30 and is provided with a mounting device 32 for mounting workpieces 34. The guide rails 14, 16 are arranged in a top region of the inner longitudinal side 12 of the machine bed 10 in such a way that the X-slide 30 can be moved above the base traverse 24 and across the latter through the portal 20. The direction of movement of the X-slide is indicated by the double arrow 2. The drive means (not shown) for moving the X-slide 30 along the X-guide may comprise a drive spindle, a linear motor or other conventional drive devices for linear motion axes.

The X-slide 30 has an underside 36 rising upward at an angle from the X-guide. As a result, even when the X-slide 30 is positioned directly in the portal passage, there is a clearance space between the underside 36 of the X-slide 30, the long column 22 and the base traverse 24 of the portal 20. In the region of this clearance space, a channel 26 running in the X-direction and intended for accommodating a chip conveying device (not shown), e.g. in the form of a conveyor belt, is formed in the base traverse 24.

On account of the considerably inclined (in the present case even vertical) arrangement of the guide plane of the X-guide defined by the guide rails 14, 16, chips which are produced during the machining of the workpiece cannot remain lying on the X-guide and impair its operation. On the contrary, they fall or slip solely on account of the force of gravity into the chip conveying device leading along the inner longitudinal side 12 of the machine bed 10 and are automatically conveyed away from the portal milling machine by this chip conveying device.

A linear guide (designated below as the Y-guide) is arranged on the front side of the portal 20. The Y-guide comprises two parallel guide rails which extend in the Y-direction and are firmly arranged one above the other on the vertical front side of the cross member 23 of the portal 20. The Y-guide serves to guide a slide 40 (Y-slide 40) which is movable in the Y-direction and on which a milling unit 50, movable in the vertical direction (also designated as the Z-direction) relative to the Y-slide 40, in the form of a spindle head 50 provided with a milling spindle 52 is arranged. The directions of movement of the Y-slide 40 and of the spindle head 50 are indicated by the double arrows 4 and 6, respectively. The drive means (not shown) for moving the Y-slide 40 and the spindle head 50 in the Y-direction and Z-direction, respectively, may again comprise a drive spindle, a linear motor or other conventional drive devices for linear motion axes.

The construction of the portal milling machine described above and shown in FIGS. 1 to 2 enables a workpiece 34 mounted on the work table 30 to be machined in the region of the inner angle of the angular plan structure of the machine. The tool processing point is therefore located in a region where the machine has optimum rigidity. In addition, good accessibility to the tool processing point is ensured by this machine design, for the tool processing point is surrounded by the machine merely on the two sides defined by the angle legs, whereas it is freely accessible from the other two sides for an operator.

A workpiece magazine 60 provided with an automatic changing device is arranged in the region behind the rear side of the portal 20, this workpiece magazine 60 enabling the portal milling machine shown in FIGS. 1 to 2 to be supplied automatically with workpiece blanks and enabling the machined workpieces to be received again from the portal milling machine.

It goes without saying that the portal milling machine shown in FIGS. 1 to 2 may also be equipped with a tool magazine and an automatic tool changing device, as is customary for milling machines. There is sufficient space in the vicinity of the tool processing point for installing a suitable tool magazine together with a tool changer without the access for an operator to the tool processing point being impaired to an excessive degree by such installation. The tool magazine and the tool changer may be installed, for example, on that part of the machine bed 10 which leads away from the portal. As a result, in combination with the automatic chip disposal and the automated work-changing magazine 60, fully automatic operation of the portal milling machine shown in FIGS. 1 to 2 can be achieved.

In summary, it may be stated that a portal milling machine which ensures good chip disposal and good accessibility to the tool processing point is specified by the invention.

What is claimed is:

1. Portal milling machine comprising
    an elongated machine bed defining an X-direction which corresponds to the machine longitudinal direction, and
    a portal arranged at right angles to the X-direction and having an elongated plan form defining a Y-direction which corresponds to the portal longitudinal direction, the portal and the machine bed forming a structure which is closed and which defines a portal passage,
    on said portal a milling unit being arranged so as to be movable in a translatory manner in a first direction and a second direction transversely to the X-direction,
    a linear guide which leads through the portal passage in the X-direction and is intended for a slide carrying a work mounting device and movable in the X-direction being attached to the machine bed, the linear guide being an essentially horizontally arranged linear guide defining a guide plane, wherein,
    in plan form, a part of the machine bed projects beyond the portal in the X-direction at least on one side, and in that the machine bed, with regard to the portal, is offset in the Y-direction toward one longitudinal end of the portal, and in that the guide plane of the linear guide, relative to the horizontal, being inclined by an angle transversely to the X-direction.

2. Portal milling machine according to claim 1, wherein the machine bed, with regard to a portal center, is offset in the Y-direction toward the one longitudinal end of the portal by more than two sixth of a clear width of the portal passage.

3. Portal milling machine according to claim 1, wherein the machine bed, with regard to a portal center, is offset in the Y-direction toward the one longitudinal end of the portal by more than one sixth of a clear width of the portal passage.

4. Portal milling machine according to claim 1, wherein an arrangement of the portal relative to the machine bed is such that the structure formed from the portal and the machine bed has essentially a two-legged right angle plan form, one leg being formed by a machine bed plan extending in the X-direction and the other leg being formed by a portal plan extending in the Y-direction.

5. Portal milling machine according to claim 1, wherein the guide plane of the linear guide, relative to the horizontal, being inclined by an angle transversely to the X-direction in such a way that chips produced during the milling fall down solely on account of the force of gravity from the linear guide or from a cover protecting the latter from the chips.

6. Portal milling machine according to claim 5, wherein the guide plane of the linear guide, relative to the horizontal, is inclined transversely to the X-direction by an angle which is greater than 40 degrees.

7. Portal milling machine according to claim 5, wherein the guide plane of the linear guide, relative to the horizontal, is inclined transversely to the X-direction by an angle which is greater than 90 degrees, so that the slide is guided in a suspended manner on the linear guide.

8. Portal milling machine according to claim 5, wherein a design of the linear guide is such that the slide movable in the X-direction on the linear guide can alternatively be mounted at various heights on the linear guide.

9. Portal milling machine according to claim 5, wherein the guide plane of the linear guide, relative to the horizontal, is inclined transversely to the X direction by an angle which is greater than 60 degrees.

10. Portal milling machine according to claim 5, wherein the guide plane of the linear guide, relative to the horizontal, is inclined transversely to the X-direction by an angle which is approximately 90 degrees.

11. Portal milling machine in particular according to claim 1, comprising a portal on which a milling unit is arranged so as to be movable in a translatory manner in a first direction and a second direction transversely to an X-direction defined by the machine longitudinal direction, and comprising an elongated machine bed to which a plane linear guide which leads essentially horizontally through the portal in the X-direction and is intended for a slide carrying a work mounting device and movable in the X-direction, wherein the structure formed from the machine bed and the portal is designed as a monolithic, homo-kinetic block.

12. Portal milling machine according to claim 11, wherein the structure formed from the machine bed and the portal is composed of individual castings which are produced from a uniform casting material, intermediate spaces possibly present between the castings after the assembly of the individual castings to form the desired structure being filled with the same casting material in order to produce a homogeneous connection between the castings with regard to the material.

13. Portal milling machine according to claim 11, wherein the portal is designed as a one-piece casting into which the machine bed, likewise designed as a one-piece casting, is inserted, the machine bed being designed like a bearer to which the linear guide is attached.

14. Portal milling machine according to claim 11, wherein the structure formed from the machine bed and the portal is designed as a one-piece casting.

* * * * *